INVENTORS
FRANK DAY &
MAGNUS L. FROBERG
BY
ATTORNEYS

United States Patent Office 3,437,327
Patented Apr. 8, 1969

3,437,327
WALL CONSTRUCTION FOR MELTING TANKS
Frank Day, Granville, and Magnus L. Froberg, Newark, Ohio, assignors to Owens-Corning Fiberglas Corporation, a corporation of Delaware
Continuation of application Ser. No. 440,803, Mar. 18, 1965. This application Feb. 26, 1968, Ser. No. 708,423
Int. Cl. F27d 1/12; F27b 3/24; C03b 5/22
U.S. Cl. 263—44                                 6 Claims

ABSTRACT OF THE DISCLOSURE

Walls of a glass melting tank are designed with a thick lower portion and a thin upper portion adjacent the glass level. The thin wall portion is cooled on the outer surface by water-cooled passages which are in direct contact with the thin wall portion and are in turn supported from behind so as to directly aid in supporting the thin wall portion as well as be in good thermal contact therewith. The inner surface of the thin wall portion is entirely back of the thick wall portion. To achieve ultimate results, the thin wall portion is less than half the thickness of the thicker portion and, preferably, does not exceed three inches in thickness.

---

This application is a continuation of application Ser. No. 440,803, filed Mar. 18, 1965, now abandoned.

This invention relates to an improved wall construction for furnaces used to melt fusible material and more particularly to a sidewall construction for glass melting tanks operated at high temperatures.

Glass melting furnaces or tanks used to melt large quantities of glass or similar fusible material must be re-built periodically, in the order of every few years. In particular, the refractory liners within the furnaces or tanks tend to wear relatively rapidly due to a combination of high temperature and the erosive and corrosive nature of the glass or other fusible material being melted. The erosion and corrosion are more pronounced for certain glass compositions, the ingredients of which tend to attack the liner more readily, and also for higher melting temperatures. Also, the wear on the liner is the greatest at and near the level or surface of the fusible material being melted.

The glass from the outlet of the tank can be directed through a forehearth to one or more marble making machines in which the glass is shaped into marbles which are subsequently used to make fibers in marble bushings. In such bushings, the marbles are fed sequentially to a melting unit where they are remelted and fibers drawn therefrom in a manner well known in the art. Rather than the marble machines, the glass can be supplied from the tank through a forehearth to direct melt bushings in which the glass is formed directly into fibers without the marble forming and remelting operations.

The tank liner usually is made mostly of zircon which is carried into the glass by erosion or dissolved therein by chemical attack of the glass on the liner. The glass containing the zircon is more dense and tends to settle at the bottom of the tank as the remainder of the glass flows from the point of batch supply to the outlet of the tank. Consequently, the dense zircon-containing glass tends to build up in the bottom of the tank over a period of time, after which is it carried downstream in the tank and into the forehearth. There the zircon recrystallizes from the dense zircon-containing glass because of the lower temperature encountered in the forehearth. The recrystallized zircon then is gradually carried in the glass to the marble machines or to fiber-forming bushings. In the event that fiber-forming bushings are used directly with the tank, the zircon "stones" or particles will cause the fibers being attenuated to break. This requires that the bushing be started again by restarting the filaments being draw therefrom. On the other hand, if the glass is made into marbles, the marble-making process will not be interrupted but the stones will continue to exist in the marbles and eventually cause breakouts when the marbles are subsequently fed to bushings. As a practical matter, when marbles containing excessive stones are made, the marbles are usually thrown away or remelted, rather than being used in the bushings. It has been found that the waste resulting from this is less expensive than using the glass and incurring a considerable amount of labor expense required to restart the bushings frequently, while producing less than full length or size packages of glass strand, which are of less value than full size packages. In some furnace operations, the amount of glass wasted has amounted to one million pounds between rebuild operations.

The present invention relates to a furnace and particularly a melting tank wall construction which overcomes the above disadvantages. In accordance with the new construction, at least some of the walls of the furnace or tank are constructed with a relatively thick lower refractory wall portion and a much thinner upper refractory wall portion, particularly in the area just above and somewhat below the level of the fusible material being melted. Further in accordance with the invention, means are provided outside the thin portion of the wall, in the area adjacent the glass level, to cool the thin portion of the wall and limit the attack of the glass thereon. The cooled wall also tends to solidify glass thereon to form additional protection, even if the sidewall is substantially entirely dissolved. While some of the refractory of the wall may still be carried into the glass, the rate of attack of the glass will be sufficiently decreased that the zircon refractory material carried into the glass will not have any material effect on subsequent fiber-forming operations. Consequently, the glass need not be remelted and a minimum number of break-outs will result from the stones or impurities in the glass. Full packages of strand and yarn then can be produced and a minimum amount of labor is needed for restarting bushings in which break-outs occur.

It is, therefore, a principal object of the invention to provide an improved wall construction for melting tanks or the like which results in less contaminants in the melted glass.

Another object of the invention is to provide a wall construction for glass melting tanks capable of producing glass which provides a more interruption-free, fiber-forming operation.

Yet another object of the invention is to provide a melting tank capable of melting glass from which fibers can be produced at less cost.

Other objects and advantages of the invention will be apparent from the following detailed description of a preferred embodiment thereof, reference being made to the accompanying drawing, in which:

FIG. 4 is a view similar to FIG. 3 of a slightly modified sidewall construction for a glass melting tank or the like.

Figure 1:
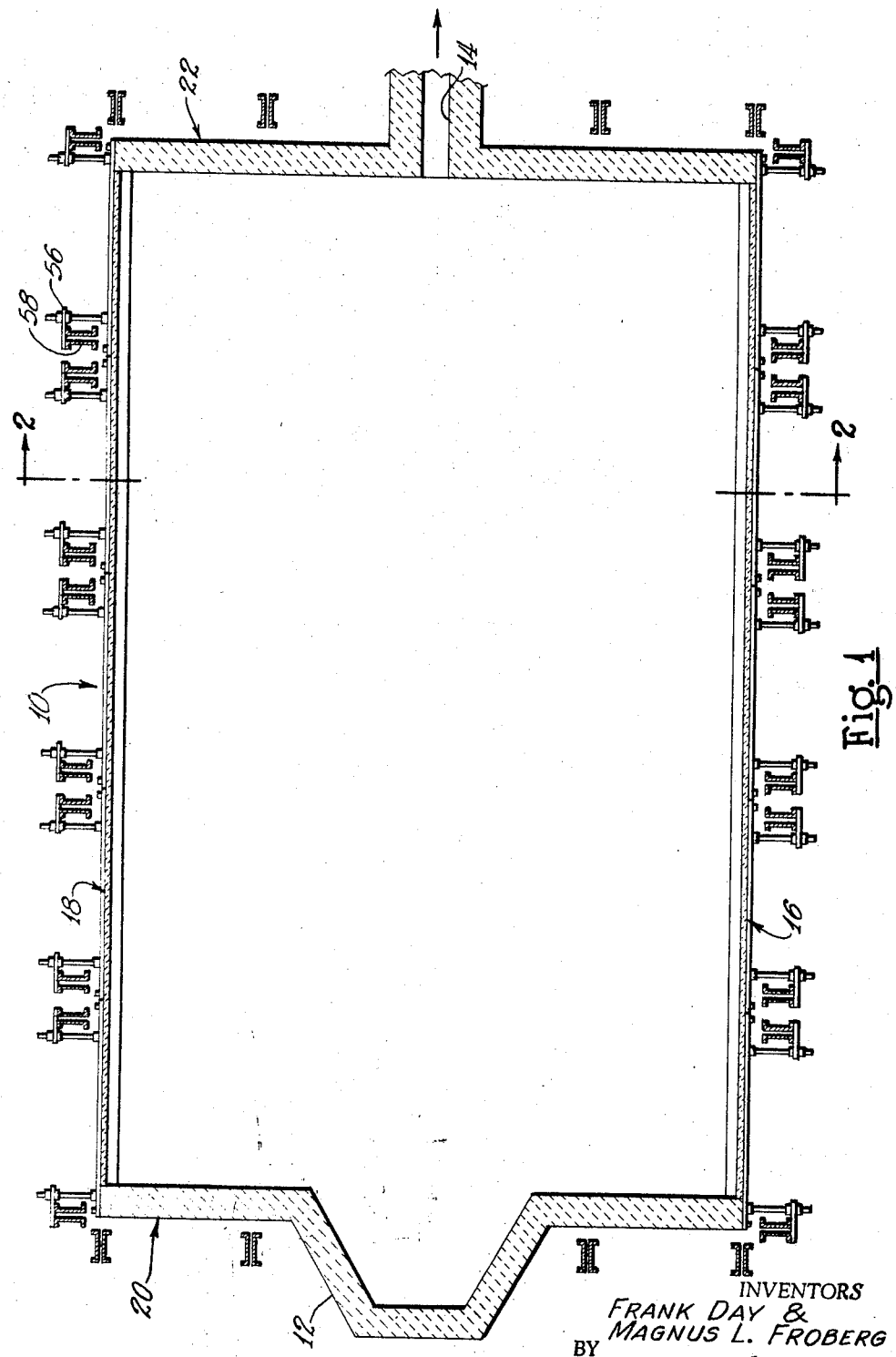
FIG. 1 is a somewhat schematic plan view of an overall glass melting furnace or tank embodying the invention.

Referring more particularly to FIG. 1, a furnace or glass melting tank 10 embodying the invention includes a glass batch supply portion 12 and an outlet 14. As the batch melts, the glass flows toward the outlet and subsequently is directed through a forehearth or other suitable channels to marble-making machines or direct melt bushings, as is known in the art. The present invention is particularly advantageous for a glass melting tank to be used with marble machines since this glass both requires a higher temperature and is more corrosive to refractory liners of the tank than many other glasses.

Figure 2:
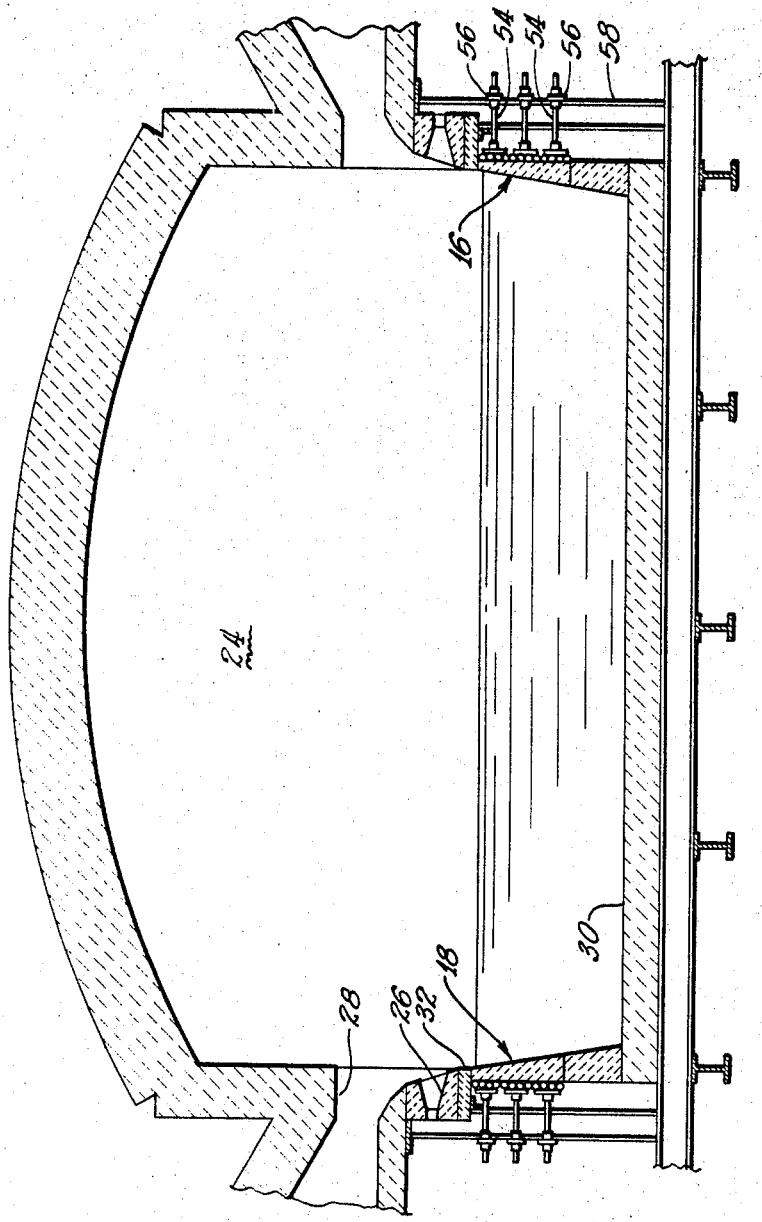
FIG. 2 is an enlarged view in vertical cross section, taken along the line 2—2 of FIG. 1.

Referring also to FIG. 2, the tank 10 includes sidewalls 16 and 18, a charge end wall 20, and an outlet end wall 22. The new wall construction can be used for the sidewalls and both end wall, although a different construction often is used for one or both end walls and particularly for the wall 20 at the end of the tank to which the batch is supplied. This is so because the batch and partially molten glass are cooler at this end and also because the glass is moving away from this wall and has minimum contact with it. The new construction has been found to be particularly advantageous in marble-making systems for the sidewalls of the tank located parallel to the direction of the glass flow therethrough.

A heating chamber 24 is located above the tank, as is well known. On each side of the heating chamber 24, and spaced substantially uniformly therealong, are a plurality of burner ports 26 to which fuel, usually oil or gas, is supplied. Combustion air is admitted to large air ports 28 which are located above the burner ports 26, there being one of the air ports for each pair of burner ports. Combusted gases from the chamber 24 exit through the opposite air ports and travel to a regenerator and finally to a stack. The combustion air is drawn through and preheated by the opposite, hot regenerator.

For the production of marbles, the glass in the tank 10 is heated by the combustion gases to exceptionally high temperatures, usually in the order of 2800°–2900° F. The combination of the high temperatures and corrosive nature of the glass renders the refractory liner of the tank 10 extremely susceptible to attack. Further, the surface of the glass is at a higher temperature than glass therebelow. The glass at the surface also has the highest rate of flow, and an oxidizing condition often is maintained in the heating chamber above the glass. These factors render the area of the wall of the tank adjacent the glass level much more susceptible to attack by erosion and corrosion. As discussed previously, the attack on the refractory of the walls causes the zircon to be mixed into some of the glass and to settle therewith until subsequently carried away through the outlet of the tank sometime later, this period often being six months or even more.

Figure 3:
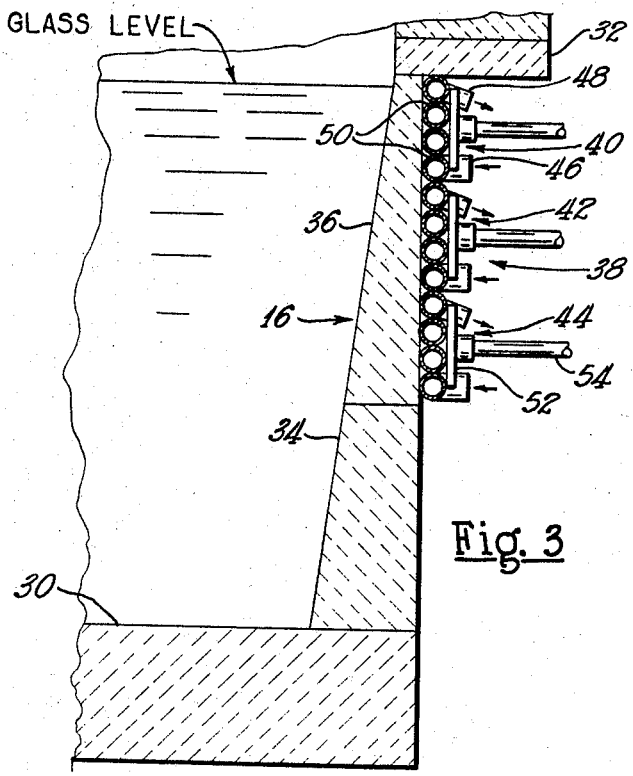
FIG. 3 is an enlarged view in vertical cross section of a sidewall of the melting tank of FIGS. 1 and 2.

This problem has been virtually overcome, however, by using the furnace wall construction shown in detail in FIGS. 2 and 3. Accordingly, each of the walls 16 and 18 forms a sidewall of the tank 10 extending from a tank bottom 30 to a tuck stone 32 which is in contact with the wall 16 of the tank and forms a base for the sidewall of the heating chamber. The wall 16 includes a lower thick portion 34 extending approximately halfway up the wall and an upper thinner portion 36. The thick portion 34 is located entirely below the level of the glass while the thin portion 36 extends from a point below the level of the glass to a point thereabove. The thick portion has an inwardly exposed surface which is slanted at the same angle as an inwardly exposed surface of the upper thin portion. The tapered construction of both portions of the sidewall provides a better base for the refractory and minimizes the possibility of it caving in, as sometimes occurs with vertical block walls. It may be noted that the inwardly exposed surface of the upper portion is entirely back of the corresponding surface of the lower portion. In practice, the lower portion will vary from a maximum thickness of approximately six inches to a minimum thickness of approximately three inches, whereas the upper portion will vary from a maximum thickness of three inches to a minimum thickness of one inch, with a thickness less than two inches being preferred. In any event, the average thickness of the upper portion is less than half the average thickness of the lower portion.

As shown in FIG. 3, at least part of the thin portion 36 of the sidewall 16 is backed up with cooling sections or apparatus 38. As specifically shown, three cooling coils or units 40, 42, and 44 are used, each of which has a lower inlet 46 and an upper outlet 48. Water supplied through the inlet 46 flows back and forth through tubes 50 to the outlet 48. The sections 40–44 are backed up by supporting plates 52 and supporting rods 54 so that the cooling section actually help to structurally support the walls of the tank. The supporting rods 54, in turn, are adjustably connected to flange plates 56 affixed to supporting beams 58 of the tank. As shown in FIG. 1, there are five of the three-coil cooling sections for each of the sidewalls 16 and 18.

Not only does the cooling apparatus 38 structurally support the sidewalls 16, it also cools the sidewall and causes the adjacent glass to tend to freeze, particularly as the refractory wears and becomes thinner. The lower temperature enables the wall to withstand the heat of the glass more effectively and also reduces the corrosive attack of the glass on the wall. If the wall is cooled enough to freeze off the adjacent glass, the glass then acts as a protective sheath between the wall and the molten glass to prevent any additional erosion or corrosion of the wall.

Figure 4:
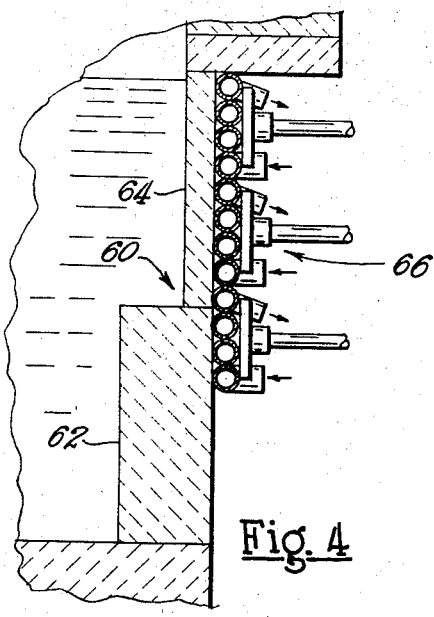

Referring to FIG. 4, a slightly modified wall 60 is shown, which wall embodies the same principles as the wall 16, but is stepped rather than tapered. As such, the wall 60 is slightly more subject to caving in than the tapered wall and for this reason is slightly less desirable. The wall 60 also includes a lower thick portion 62 extending about half-way up the wall 60, and an upper thinner portion 64 constituting the remainder of the wall. Again, the thick portion is located entirely below the level of the molten glass in the tank whereas the thin portion extends from a point below the level to a point above it. The thin portion 64 is entirely back of the thick portion with the thickness of the upper portion always less than half the thickness of the lower portion. The thick portion has a thickness ranging from three to six inches and the thin portion has a thickness from one to three inches, preferably less than two inches. Cooling apparatus 66 backs up the thin portion and extends to a point well below the level of the glass and preferably below the lower edge of the thin portion. The cooling means reduces erosion and corrosion of the wall and freezes the molten glass near the jacket, particularly if the thin wall portion 64 wears slightly. When the glass freezes and is maintained below the melting temperature by the cooling means, the glass in effect constitutes a part of the sidewall and again acts as a sheath between the thin wall portion and the molten glass in the tank. This will occur before any substantial quantity of the refractory material is carried into the molten glass so that contamination of glass is held to a minimum.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. In a furnace for melting fusible material at high temperatures, said furnace including a melting tank and a heating chamber thereabove, said tank having structural sidewalls and a bottom, means for adding fusible material batch to be melted at one portion of the tank, means for removing the molten material at another portion of the tank, and means for supplying heat to the chamber above the tank, the improvement comprising said structural sidewalls having a thick refractory lower portion below the level of the fusible material in the tank and a thin refractory upper portion extending above and below the level of the fusible material in the tank, said thin upper portion having an average thickness not more than about one-half the average thickness of the thick lower portion, both portions being of highly refractory material which is subject to deterioration under the influence of the heat and the material being fused, the entire inwardly-facing surface of said thin portion being behind the entire inwardly-facing surface of said thick portion, means forming a coolant passage contiguous with the outer surface of at least a substantial part of said thin wall portion in the area adjacent the level of the fusible material in the tank, said coolant passage means engaging said thin wall portion of said structural sidewall and effective to add structural strength thereto, means for supplying coolant to said passage, and means for removing the coolant from said passage after extracting heat from said upper portion.

2. In a furnace for melting fusible material at high temperatures, said furnace including a melting tank and a heating chamber thereabove, said tank having structural sidewalls and a bottom, means for adding fusible material batch to be melted at one portion of the tank, means for removing the molten material at another portion of the tank, and means for supplying heat to the chamber above the tank, the improvement comprising at least some of said structural sidewalls having a refractory lower portion below the level of the fusible material in the tank, and a thinner refractory upper portion extending above and below the level of the fusible material in the tank, both portions being of highly refractory material which is subject to deterioration under the influence of the heat and the material being fused, said upper portion having an inwardly-facing surface entirely back of said lower portion, means forming a coolant passage contiguous with the outer surface of said thin wall portion in the area adjacent the level of the fusible material in the tank, said coolant passage means engaging said thin wall portion of said structural sidewall and effective to add structural strength thereto, means for supplying coolant through said passage, and support means for holding and backing up said coolant passage means.

3. A furnace according to claim 2 wherein the inwardly-facing surfaces of said upper and lower wall portions are uniformly slanted.

4. A furnace according to claim 2 wherein the inwardly-facing surfaces of said upper and lower portions are vertical and a step is formed therebetween.

5. A furnace according to claim 2 wherein the average thickness of said upper portion does not exceed three inches.

6. A furnace according to claim 2 wherein the average thickness of said upper portion is less than half the average thickness of said lower portion.

References Cited

UNITED STATES PATENTS

| 2,042,660 | 6/1936 | Hulton | 65—355 X |
| 1,390,614 | 9/1921 | Hurley | 65—356 |

FOREIGN PATENTS 548,575  10/1942  Great Britain.

DONALL H. SYLVESTER, *Primary Examiner.*

A. D. KELLOGG, *Assistant Examiner.*

U.S. Cl. X.R.

65—337, 346, 355; 263—11